(12) United States Patent
Wang et al.

(10) Patent No.: US 11,268,739 B2
(45) Date of Patent: Mar. 8, 2022

(54) SYSTEM FOR HEAD PRESSURE CONTROL

(71) Applicant: SCHNEIDER ELECTRIC IT CORPORATION, Foxboro, MA (US)

(72) Inventors: Jinhui Wang, Shanghai (CN); John H. Bean, Jr., Littlestown, PA (US); Hongwei Yang, Shanghai (CN)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 16/616,819

(22) PCT Filed: Jan. 12, 2018

(86) PCT No.: PCT/CN2018/072431
§ 371 (c)(1),
(2) Date: Nov. 25, 2019

(87) PCT Pub. No.: WO2019/136702
PCT Pub. Date: Jul. 18, 2019

(65) Prior Publication Data
US 2020/0355412 A1 Nov. 12, 2020

(51) Int. Cl.
*F25B 41/04* (2006.01)
*F25B 39/04* (2006.01)
(Continued)

(52) U.S. Cl.
CPC ............ *F25B 39/04* (2013.01); *F25B 6/02* (2013.01); *F25B 41/20* (2021.01); *F28D 1/0443* (2013.01);
(Continued)

(58) Field of Classification Search
CPC .......... F25B 6/02; F25B 39/04; F25B 49/027; F25B 2600/2517; F28D 1/05308
See application file for complete search history.

(56) References Cited

U.S. PATENT DOCUMENTS 4,972,684 A * 11/1990 Aitken ................. A44C 15/002
63/7
5,088,294 A * 2/1992 Ando ...................... F25B 39/04
165/110
(Continued)

FOREIGN PATENT DOCUMENTS

| CA | 2298754 A1 * | 8/2001 | ............ F25B 49/027 |
|---|---|---|---|
| CN | 1517637 A | 8/2004 | |

(Continued)

OTHER PUBLICATIONS

Notification of Transmittal of the International Search Report and the Written Opinion of the International Searching Authority from corresponding PCT/CN2018/072431 dated Sep. 25, 2018.

(Continued)

*Primary Examiner* — Jonathan Bradford
(74) *Attorney, Agent, or Firm* — Lando & Anastasi, LLP (57) ABSTRACT

A condenser (404) configured to condense gas phase refrigerant to liquid phase refrigerant. The condenser (404) includes a gas header (408) configured to receive gas phase refrigerant, a liquid header (410) disposed opposite the gas header, the liquid header (410) separated into at least two sections, each section of the at least two sections having a port, and parallel tubes (406) extending between the gas header (408) and the liquid header (410).

12 Claims, 8 Drawing Sheets

(51) Int. Cl.
*F25B 41/20* (2021.01)
*F28D 1/04* (2006.01)
*F28D 1/053* (2006.01)
*F25B 6/02* (2006.01)
*F25B 49/02* (2006.01)
*F28D 21/00* (2006.01)

(52) U.S. Cl.
CPC ........ *F28D 1/05308* (2013.01); *F25B 49/027* (2013.01); *F25B 2400/16* (2013.01); *F25B 2600/2513* (2013.01); *F25B 2600/2517* (2013.01); *F25B 2700/195* (2013.01); *F28D 2021/0068* (2013.01)

(56) References Cited

U.S. PATENT DOCUMENTS

| | | | | |
|---|---|---|---|---|
| 5,394,710 | A * | 3/1995 | Matsuo | B60H 1/3229 165/113 |
| 5,444,993 | A * | 8/1995 | Yamamoto | F25B 39/04 62/196.4 |
| 5,709,097 | A * | 1/1998 | Kim | F24F 3/065 62/175 |
| 5,946,940 | A * | 9/1999 | Inoue | F28F 9/02 62/509 |
| 8,839,638 | B2 * | 9/2014 | Kashirajima | H05K 7/20827 62/259.2 |
| 2001/0020366 | A1 | 9/2001 | Cho et al. | |
| 2005/0138936 | A1 | 6/2005 | Dub | |
| 2006/0288713 | A1 * | 12/2006 | Knight | F25B 49/027 62/176.6 |
| 2008/0041092 | A1 | 2/2008 | Gorbounov et al. | |
| 2011/0259551 | A1 | 10/2011 | Kasai et al. | |
| 2013/0206378 | A1 * | 8/2013 | Kent | F25B 39/04 165/173 |
| 2014/0130534 | A1 * | 5/2014 | Scheumann | F25B 6/02 62/291 |
| 2014/0223934 | A1 * | 8/2014 | Zolli | F25B 39/04 62/115 |
| 2017/0307251 | A1 * | 10/2017 | Baruch | F24F 13/30 |

FOREIGN PATENT DOCUMENTS

| | | |
|---|---|---|
| CN | 2926937 Y | 7/2007 |
| CN | 201748703 U | 2/2011 |
| CN | 102859299 A | 1/2013 |
| CN | 205690755 U | 11/2016 |
| DE | 10060114 A1 | 6/2001 |
| DE | 10045905 A1 | 3/2002 |
| JP | S5316943 A | 2/1978 |
| WO | 2016074682 A1 | 5/2016 |

OTHER PUBLICATIONS

Extended European Search Report from corresponding European Application No. 18899884.3 dated Sep. 22, 2021.

* cited by examiner

SYSTEM FOR HEAD PRESSURE CONTROL

CROSS-REFERENCE TO RELATED APPLICATIONS

This application is a U.S. National Stage Application under 35 U.S.C. § 371 of International Application No. PCT/CN2018/072431, filed Jan. 12, 2018, titled SYSTEM FOR HEAD PRESSURE CONTROL, which is hereby incorporated herein by reference in its entirety.

BACKGROUND

Figure 1:
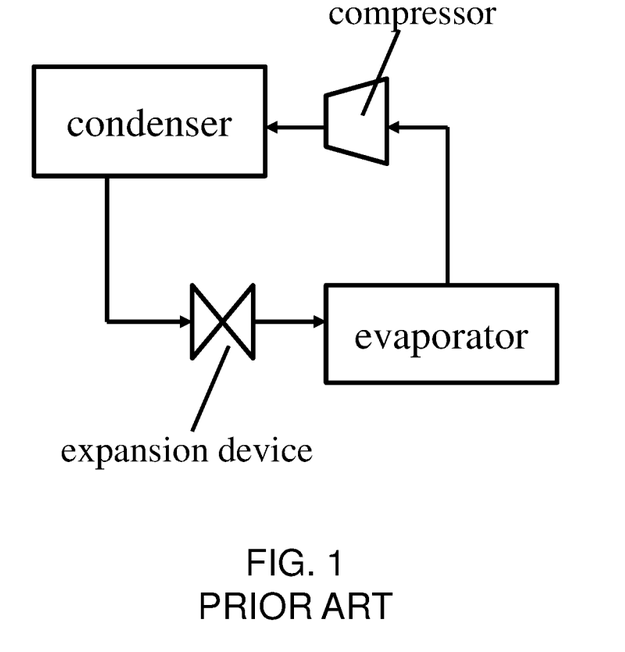
FIG. 1 is schematic illustration of a conventional DX system.

Direct expansion (DX) air conditioners are useful in small to medium sized buildings and have certain advantages over other types of cooling systems, such as conventional chilled-water based air conditioning (AC) systems, because DX systems typically have higher energy efficiencies and lower ownership and maintenance costs. DX systems generate conditioned air via a refrigeration cycle using compressors. Liquid refrigerant passes through an expansion device, which is typically a valve, before entering a cooling coil (an evaporator). The expansion device reduces the pressure and temperature of the refrigerant to the point where it is colder than the air passing through the coil. Cooling can thus be accomplished by blowing air over the cooling coil. DX systems owe their efficiency to the fact that the air used for cooling a conditioned space is directly chilled by the refrigerant in the cooling coil of the air handling unit. As shown in FIG. 1, the components of a DX system typically include an evaporator, a compressor, a condenser, and an expansion device, although any system that uses refrigerant and an evaporator coil can be called a DX system.

One example of a method for heat removal in an indoor space, such as a computer room or data center, combines an air-cooled computer room air conditioner (CRAC) with a condenser, and is typically referred to as an air-cooled CRAC DX system. Air-cooled CRAC units can be used in IT environments and are usually configured in such a way that half the components of the refrigeration cycle are in the CRAC (and in the IT space or environment to be cooled) and the remaining components are outdoors in an air-cooled condenser. Heat from the IT environment is "pumped" to the outdoor environment using a circulating flow of refrigerant. A compressor may reside in either the CRAC unit or in the condenser.

There is a large difference between the cooling loads required by computer and data processing applications and other commercial applications, since commercial systems typically transfer to heating modes during winter or colder weather. In contrast, computer and data processing applications associated with data centers require cooling loads over the course of the entire year. Air-cooled CRAC systems therefore need to accommodate temperatures as high as 46° C. and as low as −40° C.

SUMMARY

Aspects and embodiments are directed to a system for controlling pressure in a condenser. One aspect in accord with the present invention is directed to a cooling system that includes a heat exchanger, a thermal expansion valve configured to control the delivery of liquid phase refrigerant to the heat exchanger, and a condenser fluidly coupled to the thermal expansion valve and configured to condense gas phase refrigerant to liquid phase refrigerant, the condenser including: a gas header configured to receive gas phase refrigerant, a liquid header disposed downstream from the gas header, the liquid header separated into at least two sections, each section of the at least two sections having a port in fluid communication with the heat exchanger, and parallel tubes extending between the gas header and the liquid header.

According to one embodiment, the cooling system further includes a head pressure control valve fluidly coupled to the liquid header and positioned between the condenser and the thermal expansion valve, the head pressure control valve configured to respond to changes in a pressure of liquid refrigerant exiting the port of a section of the at least two sections.

According to another embodiment, the head pressure control valve is configured as an inlet pressure regulating valve.

According to another embodiment, the head pressure control valve is configured as a solenoid valve.

According to one embodiment, at least one section of the at least two sections of the liquid header has an internal volume that is of a different size than an internal volume of another section of the at least two sections.

According to another embodiment, the liquid header is separated into a first section and a second section, and the head pressure control valve is positioned in between the port of the first section and the port of the second section. According to a further embodiment, the port of the first section of the liquid header is configured to be fluidly coupled to the thermal expansion valve and the head pressure control valve is configured such that the port of the second section of the liquid header is in selective fluid communication with the thermal expansion valve. According to another embodiment, the head pressure control valve is configured to direct liquid refrigerant to the port of the second section of the liquid header when the pressure of liquid refrigerant exiting the port of the first section exceeds a predetermined value.

According to one embodiment, the first section of the liquid header is configured to have a smaller internal volume than an internal volume of the second section of the liquid header.

According to another embodiment, the first section of the liquid header is configured to have a larger internal volume than an internal volume of the second section of the liquid header.

According to one embodiment, the gas header is separated into a first section and a second section, the first section of the gas header fluidly coupled to the first section of the liquid header by a first series of parallel tubes, and the second section of the gas header fluidly coupled to the second section of the liquid header by a second series of parallel tubes.

According to one embodiment, the first section of the gas header, the first section of the liquid header, and the first series of parallel tubes has an internal volume of from about 25% to about 50% of a total internal volume of the condenser.

According to one embodiment, the cooling system further includes a receiver configured to store liquid refrigerant and positioned in between the condenser and the thermal expansion valve such that the port of the first section of the liquid header is fluidly coupled to the receiver and the port of the second section of the liquid header is in selective fluid communication with the receiver.

According to one embodiment, the condenser is configured as an air-cooled condenser and the system further comprises at least one air moving device configured to direct air over the condenser. According to a further embodiment, the air moving device includes at least one variable speed fan.

According to one embodiment, the heat exchanger includes an evaporator unit configured to expand liquid phase refrigerant to gas phase refrigerant. According to another embodiment, the heat exchanger further includes a compressor positioned downstream from the evaporator unit, the compressor fluidly coupled to the gas header of the condenser.

Another aspect in accord with the present invention is directed to a condenser configured to condense gas phase refrigerant to liquid phase refrigerant that includes a gas header configured to receive gas phase refrigerant, a liquid header disposed opposite the gas header, the liquid header separated into at least two sections, each section of the at least two sections having a port, and parallel tubes extending between the gas header and the liquid header.

According to one embodiment, at least one section of the at least two sections of the liquid header has an internal volume that is of a different size than an internal volume of another section of the at least two sections.

According to one embodiment, at least one port of a section of the at least two sections is configured as an outlet for liquid phase refrigerant. According to another embodiment, at least one port of another section of the at least two sections is configured as an inlet for liquid phase refrigerant.

According to one embodiment, the gas header is separated into at least two sections, each section of the at least two sections having an inlet for receiving gas phase refrigerant.

According to one embodiment, the condenser further includes at least one air moving device configured to direct air over the parallel tubes.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments," "certain embodiments," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Cooling systems for removing heat in conditioned spaces such as IT environments use heat transport fluids such as air, water, or refrigerant to transport heat energy from indoors to outdoors. Many cooling systems rely on the refrigeration cycle as the primary means of cooling and pumped refrigerant systems can provide isolation between the primary heat removal system and the IT equipment. Direct and indirect air methods rely on the outdoor conditions as the primary means of cooling, which makes them more efficient for mild climates.

Although some of the examples discussed herein refer to an IT environment, the systems and techniques discussed in this disclosure may be applied to any confined space (also referred to herein as a "conditioned space"), such as a room, inside a building or other structure that contains air to be cooled. For example, the space to be cooled may be one or more rooms in a public or private building, such as a private residence, office space, or other commercial or municipal space, or may include spaces within an industrial or manufacturing complex.

In some embodiments, the space being cooled is a data center or IT environment. A data center may include one or more rooms or spaces that contain rows of equipment racks designed to house electronic equipment, such as data processing, networking, and telecommunications equipment. During operation, the electronic equipment generates heat that needs to be removed to ensure the continued performance, reliability, and useful life of the equipment components housed by the equipment racks. One or more embodiments of the systems disclosed herein are designed to remove heat produced by the electronic equipment within the data center and return cool air back to the data center.

Figure 2:
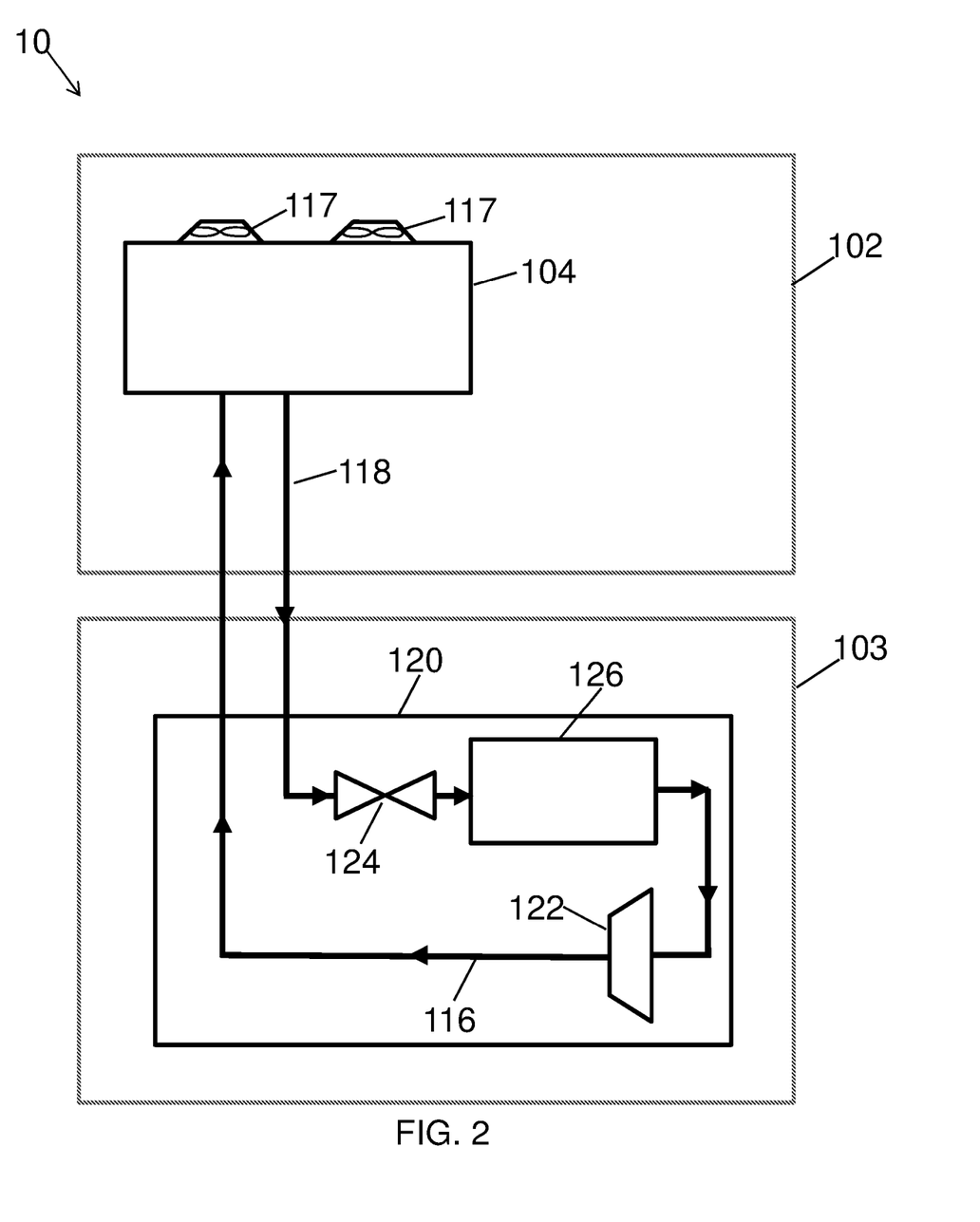
FIG. 2 is a block diagram of an example of an air-cooled CRAC DX cooling system.

One example of a method for heat removal in an IT environment includes a CRAC DX device that is paired with an air-cooled condenser. An example of this type of cooling system is shown in FIG. 2, and is generally indicated at 10. The system 10 includes an air-cooled condenser 104, one or more air moving devices 117, such as fans, and a CRAC DX device 120 (also referred to as simply "CRAC" or "CRAC device") that includes an evaporator 126, a compressor 122, and an expansion valve 124, which function as described above.

The air-cooled condenser 104, also referred to herein as simply a "condenser," and also referred to as a "dry cooler," "dry heat rejection unit," or "outdoor heat exchanger," is a type of heat exchanger where air is used to cool the heat transport fluid (e.g., glycol) flowing through the cooling coils, as opposed to "wet" evaporative cooling techniques that spray water into the air stream to create a cooling effect. A dry cooler uses one or more condensing fans as the air moving devices 117 to perform its cooling function.

In this type of system, the refrigeration cycle components (e.g., the air-cooled condenser 104) may be positioned in an enclosure external to the space being cooled, and a heat exchanger (e.g., CRAC 120) may be positioned in the space being cooled. The example system 10 shown in FIG. 2 has the air-cooled condenser 104 positioned in an outside environment 102 (e.g., a roof) of the building or enclosure that includes the indoor space 103 (e.g., IT environment) being cooled. The outdoor heat exchanger 104 uses flowing glycol or other refrigerant as a heat transport fluid that collects heat from the CRAC device 120 and transports it away from the IT environment 103. Gas phase (also referred to as vapor phase) refrigerant 116 flows via pipes to the air-cooled condenser 104 where it condenses to a liquid and the heat is rejected to the outside atmosphere by the fans 117 that blow ambient air over the condensing coils of the air-cooled condenser 104. Liquid phase refrigerant 118 is then returned to the CRAC device 120 to begin the cycle over again. A pump and other components (not shown in FIG. 2), such as a motor, are used to circulate the refrigerant in its loop to and from the CRAC 120 and air-cooled condenser 104.

Air conditioning and refrigeration systems such as the cooling system 10 shown in FIG. 2 that utilize air-cooled condensing units typically experience two main problems that have to be resolved if the system is to operate reliably and economically under both high and low ambient conditions. High ambient conditions (e.g., 40+° C.) can typically be accommodated by properly sizing the condensing unit. However, many cooling systems also need to operate at ambient temperatures that fall below their design dry bulb temperature during at least a portion of the year. Without adequate head pressure control during operation at low ambient conditions, the cooling system can experience both running-cycle and off-cycle problems.

One running-cycle problem involves an inadequate pressure differential across the expansion valve, which results in low head pressure and insufficient refrigerant to be fed to the evaporator. In addition, any system that uses hot gas for defrost or compressor capacity control requires normal head pressure in order to operate properly, since low head pressure can result in low suction pressure or iced evaporator coils. In both instances, this means that the pressure of the liquid phase refrigerant 118 entering the expansion valve 124 needs to be maintained at a minimum pressure (i.e., a predetermined pressure value).

The primary off-cycle problem for these systems involves the inability to get the system online if the refrigerant has migrated to the condenser. The evaporator 126 may not build up enough pressure in the refrigerant to send to compressor 122, or the pressure may be so low that the compressor simply cycles continuously.

The two conventional methods for addressing the problems outlined above and maintaining adequate head pressure in a refrigeration system during periods of low ambient temperature can be used independently or in combination and include (1) controlling the condenser fan speed and (2) implementing the use of a flooded receiver.

Air moving device 117 can include at least one variable speed fan, and the speed of the fans 117 used by the air-cooled condenser 104 can be controlled using pressure measurements taken at the inlet and outlet of the condenser 104. For instance, one or more pressure sensors may be installed at the condenser header or inlet/outlet piping. When the condensing pressure (i.e., liquid phase refrigerant 118 exiting the condenser) is lower than a predetermined value or predetermined range of values, then the speed of the fans 117 may be reduced or otherwise adjusted to increase the condenser pressure by lowering the speed of the fans. However, this approach is typically only feasible when the ambient temperature exceeds 0° C.

To address the ability to operate at ambient temperatures below 0° C., a cooling system such as that shown in FIG. 3 and generally indicated at 30 may be implemented according to a conventional method. Cooling system 30 of FIG. 3 includes an air-cooled condenser 104, compressor 122, evaporator 126, and expansion valve 124, which function in a similar manner as described above. Cooling system 30 also includes a three-way modulating valve 330, which is in fluid communication with both the gas phase refrigerant 116 entering the condenser 104 and the liquid phase refrigerant 118 exiting the condenser 104 and is configured to respond to discharge pressure from the compressor 122. The cooling system 30 also includes a liquid receiver 335 for storing the refrigerant, which in some instances may be a mixture of ethylene glycol and water. The three-way modulating valve 330 is also in fluid communication with the receiver 335 and includes an internal diaphragm and a pressurized dome.

The three-way modulating valve 330 is configured to restrict the flow of liquid phase refrigerant 118 from the condenser 104 to the receiver 335, while at the same time diverting vapor phase refrigerant 116 to the inlet of the receiver 335. This results in liquid phase refrigerant 118 backing up in the condenser 104, which reduces its capacity, which in turn increases the condensing pressure. At the same time, the vapor phase refrigerant 116 diverted through the three-way modulating valve 330 raises the liquid pressure in the receiver 335, which allows the system to operate normally. The dome charge of the valve 330 expands and contracts in volume and acts on the internal diaphragm as the outside ambient temperature changes. The expansion and contraction of the pressure charge moves the diaphragm, which in turn moves a piston in the valve and modulates the valve either in a more open or closed position. When the pressure of the condenser is above a predetermined value or predetermined range of values, the valve 330 directs the gas phase refrigerant 116 from the compressor 122 through the condenser 104 and into the receiver 335. If the ambient temperature falls below a predetermined value or predetermined range of values, then the condensing pressure falls and the pressure of the liquid phase refrigerant 118 from the condenser 104 also falls to a point below that of the bellows in the dome of the valve 330. This causes a piston to move in the valve 330 and partially restrict the flow of refrigerant 118 leaving the condenser 104. The condenser 104 will then partially flood with refrigerant to maintain a certain condensing pressure. At the same time, discharge gas (gas phase refrigerant 116) bypasses the condenser 104 via valve 330 and flows directly to the receiver 335.

In cooling system 30, additional refrigerant is also added beyond the amount needed during normal operating charge for purposes of flooding the condenser 104 and thus blocking the heat transfer area (i.e., the area available for condensing). Thus, during operation a minimal flooding of the condenser 104 is always maintained, i.e., a certain amount of liquid phase refrigerant 118 is always trapped to thereby subcool the liquid refrigerant before discharging it to the receiver 335 at all ambient temperatures. Although not explicitly shown in FIG. 3, a check valve may also be installed between the three-way modulating valve 330 and the receiver 335 to prevent the refrigerant from migrating back to the condenser 104 during an off-cycle.

The solution presented in cooling system 30 can be very costly and difficult to implement. For instance, the system can require many components, including the three-way modulating valve 330, the receiver 330, a check valve, a safety valve, and other accessories, which increases the work load in both the implementation and maintenance phases of operation of the system. The receiver 335 needs to have a large volume (and is thus expensive), and the use of additional refrigerant also increases costs. In addition, the receiver and safety valve may require special design considerations, and when the ambient temperature is below −20° C., special materials may be required, which also increases costs. A more affordable system and method that is also capable of maintaining head pressure at temperatures below 0° C. is therefore desired.

Figure 3:
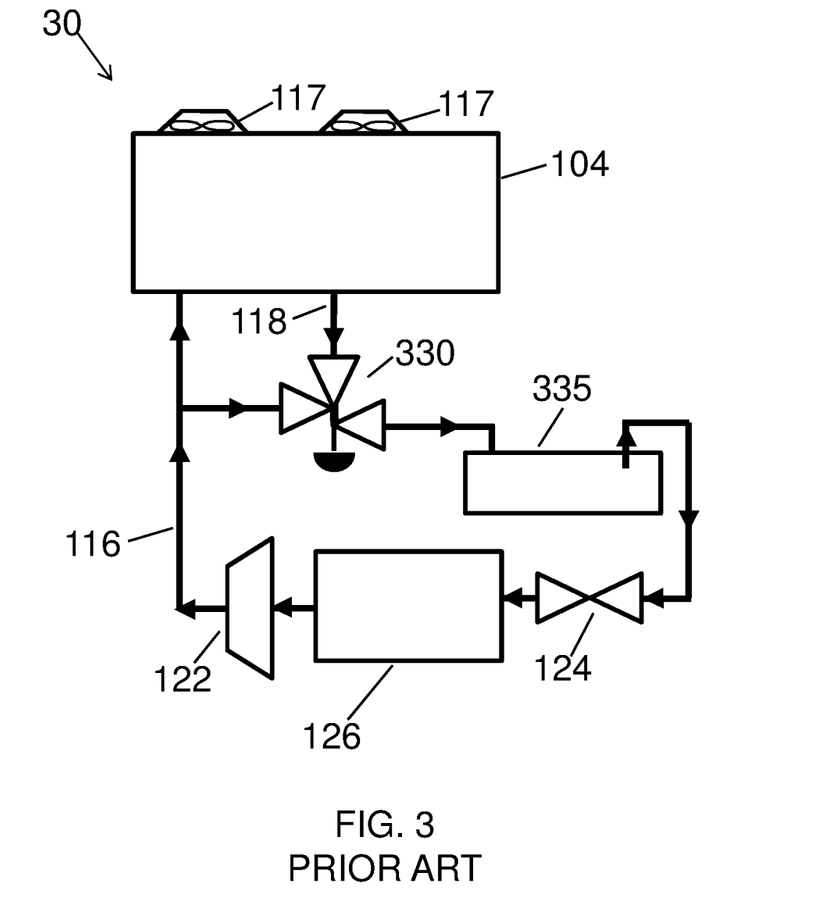
FIG. 3 is a block diagram of a conventional cooling system that uses an air-cooled condenser in combination with a receiver and head pressure control valve.

In order to address the ability to maintain adequate head pressure at low ambient temperatures and to decrease the costs associated with implementing a flooded receiver such as that shown in the cooling system 30 of FIG. 3, a cooling system is provided in one embodiment. In contrast to the use of a large receiver for flooding the condenser, in one embodiment the inlet and/or outlet piping of the air-cooled condenser may be partitioned for purposes of reducing the heat transfer area.

Figure 4:
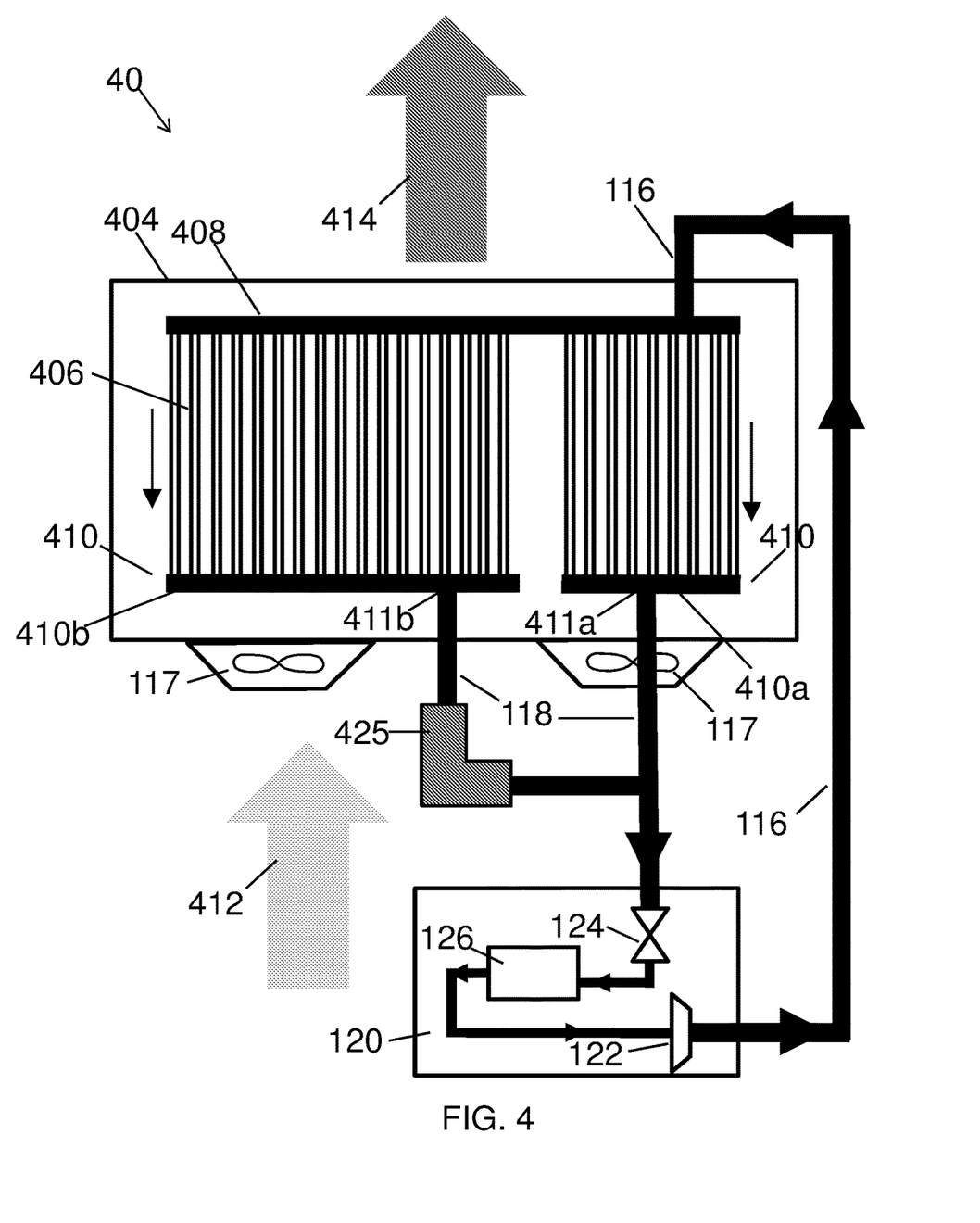
FIG. 4 is a block diagram of one example of a cooling system in accordance with one or more aspects of the invention.

FIG. 4 is a block diagram of a cooling system, generally indicated at 40, according to an exemplary embodiment of the present invention. The cooling system 40 includes a CRAC DX device 120 as previously described, and an air-cooled condenser 404. The air-cooled condenser 404 includes a vapor refrigerant header 408, also referred to as a "gas header," and liquid refrigerant header 410, also referred to as a "liquid header." A series of parallel tubes 406 extend between the gas header 408 and the liquid header 410 and function as the heat exchanging portion of the condenser 404 between the refrigerant passing through each tube and air passed over the tubes (i.e., ambient air 412). As gas phase refrigerant 116 flows through the gas header 408 and tubes 406 of the condenser 404, i.e., as indicated by the arrows in FIG. 4, it cools and condenses and is collected as condensed liquid phase refrigerant 118 by the liquid header 410. The cooling effect is achieved by the fans 117 blowing ambient air 412 over the tubes 406, which exits the condenser 404 as exhaust air 414. The tubes 406 may also include one or more fins (not shown in FIG. 4) to assist in achieving the heat transfer effect. Although the example shown in FIG. 4 indicates the flow of gas phase refrigerant 116 through the tubes 406 is in one direction, it is to be appreciated that in other embodiments, the tubes 406 may be configured such that the gas phase refrigerant 116 flows through the tubes 406 in a serpentine manner as it condenses to liquid phase refrigerant 118.

In some embodiments, the liquid header 410 is split into multiple sections or portions. The example shown in FIG. 4 has the liquid header 410 split into two sections 410a and 410b. Each section 410a, 410b of the liquid header 410 has a respective port, and section 410a has port 411a and section 410b has port 411b. According to one embodiment, one section is sized to be smaller than the other section. For instance, in the example shown in FIG. 4, section 410a is smaller than section 410b, i.e., the surface area and internal volume of section 410a is smaller than the surface area and internal volume of section 410b. The size ratio between the sections may depend on one or more factors, such as the size of the desired system and the desired operating ambient temperature range. In some embodiments, the two sections may be about the same size, and in alternative embodiments section 410a may be larger than section 410b. In yet other alternative embodiments, the liquid header 410 may be split into more than two sections, e.g., three or four sections.

Liquid header 410 may be split such that a length (i.e., the dimension that is parallel and positioned opposite the gas header 408) of the liquid header 410 is divided into two or more sections. The example shown in FIG. 4 has the liquid header 410 split into two separate sections that are separated by space, but in some instances, the liquid header 410 may be divided using partitions positioned within the internal volume of the liquid header 410.

Cooling system 40 also includes a head pressure control valve 425, which is positioned downstream and in between the ports 411a and 411b of the two liquid header sections 410a and 410b such that the head pressure control valve 425 is fluidly coupled to both ports 411a and 411b.

The configuration shown in FIG. 4 has the valve 425 positioned at an approximate corner of an "L" shaped conduit that extends between port 411b and a conduit that fluidly couples to port 411a. As explained in further detail below, the head pressure control valve 425 is configured to respond to changes in the condensing pressure. The example shown in FIG. 4 has an inlet of head pressure control valve 425 fluidly coupled to port 411a, and an outlet of head pressure control valve 425 fluidly coupled to port 411b.

Section 410a of the liquid header 410 (i.e., the smaller section) is configured to be in fluid communication with the CRAC 120 (e.g., the expansion valve of the CRAC) under all operating conditions, such that port 411a functions as an outlet for liquid phase refrigerant 118 from liquid header 410 and port 411a is fluidly coupled to the thermal expansion valve of CRAC 120. As explained further below, section 410b of the liquid header 410 (i.e., the larger section) is configured to be in selective fluid communication with the thermal expansion valve of CRAC 120 via the head pressure control valve 425. The two sections 410a and 410b of the liquid header 410 can operate in cooperation with each other for purposes of reducing the heat transfer area in the condenser 404.

Figure 5A:
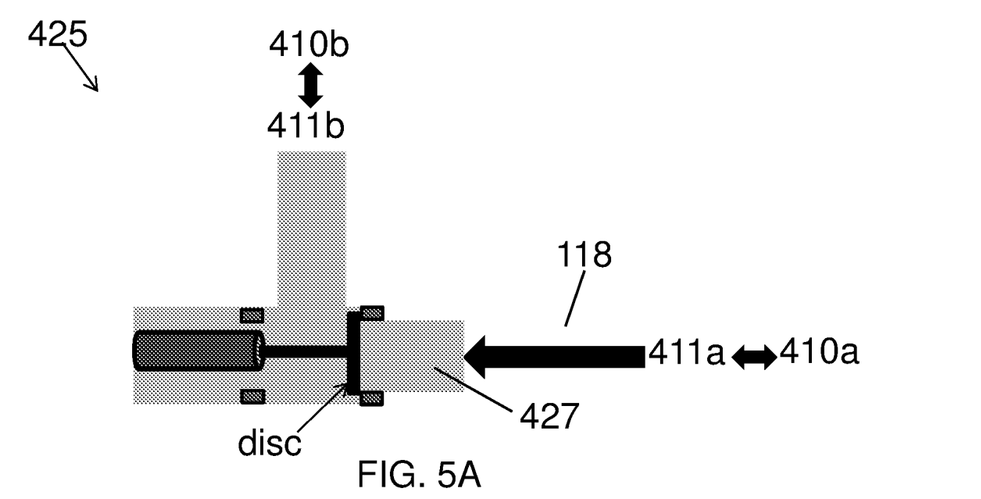
FIG. 5A is a block diagram of a head pressure control valve in a closed configuration in accordance with one or more aspects of the invention.
Figure 5B:
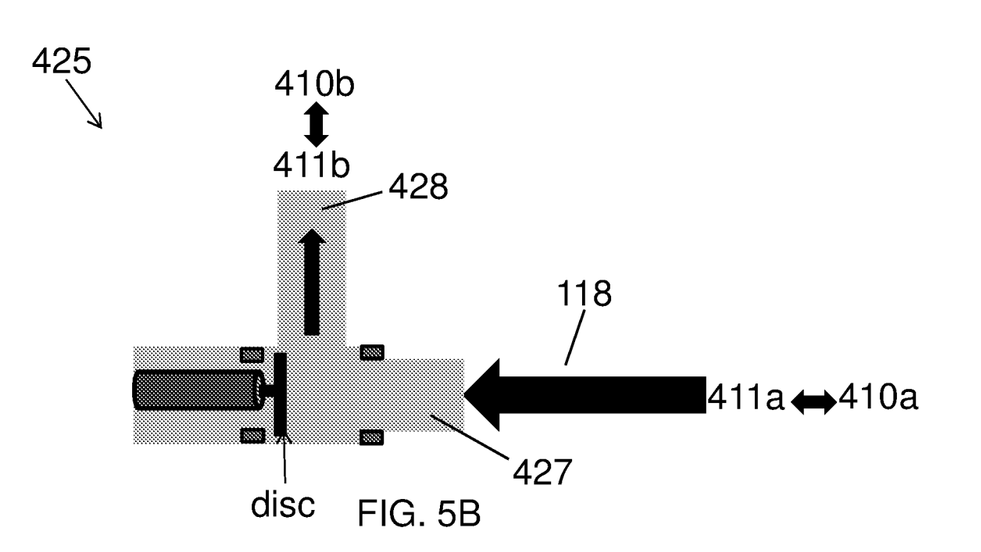
FIG. 5B is a block diagram of the head pressure control valve of FIG. 5A in an open configuration in accordance with one or more aspects of the invention.

In accordance with some embodiments, the head pressure control valve 425 is configured as an inlet pressure regulating valve. Valve 425 may be configured to open when the pressure upstream of the valve 425 exceeds a predetermined pressure value. Operation of one example of a head pressure control valve 425 is shown in FIGS. 5A and 5B. A disc in the valve 425 functions to open and close the valve based on the pressure of the refrigerant liquid 118 coming into an inlet 427 of the valve 425 from port 411a of liquid header section 410a. Referring to FIG. 5A, when the ambient temperature drops, the condenser capacity is increased and the condensing pressure falls, which results in a lower pressure of liquid phase refrigerant 118 coming in the inlet 427 and less pressure on the disc, which keeps the valve 425 in the closed position. This prevents liquid phase refrigerant 118 from entering port 411b of the liquid header section 410b (and tubes 406 connected to liquid header section 410b). The liquid header section 410b and corresponding tubing 406 will thus be at least partially blocked, which reduces the heat transfer area and increases the condensing pressure.

Referring to FIG. 5B, an increase in the pressure of liquid phase refrigerant 118 above the valve setting (i.e., based on a predetermined pressure of the liquid phase refrigerant 118) coming in the inlet 427 causes the disc to move and the valve 425 to modulate to the open position. Liquid phase refrigerant 118 can then flow through the valve 425 and exit the outlet 428 to port 411b of liquid header section 410b, such that port 411b functions as an inlet for liquid refrigerant 118. The liquid header section 410b and corresponding tubing are thus opened up, increasing the heat transfer area of the condenser. According to exemplary embodiments, head pressure control valve 425 is commercially available as a Sporlan ORI valve (Sporlan Division of the Parker Hannifin Corporation, Missouri, USA).

According to certain embodiments, valve 425 may be configured to allow liquid phase refrigerant 118 from port 411b to exit liquid header section 410b and flow through valve 425 and be in fluid communication with liquid phase refrigerant 118 exiting from port 411a (and liquid header section 410a). In this embodiment, port 411b functions as an outlet to liquid header section 410b and the liquid phase refrigerant 118 exiting port 411b is in fluid communication with CRAC 120 (i.e., the thermal expansion valve 124). Port 411b may function as an outlet for liquid phase refrigerant under conditions when more capacity of the condenser 404 is needed beyond the condensing capacity provided by liquid header section 411a (and the tubes 406 associated with section 410a).

In some embodiments, a liquid receiver may be positioned in between the condenser 404 and the CRAC 120 such that liquid phase refrigerant 118 exiting port 411a of liquid header section 410a is fluidly coupled to the liquid receiver. Cooling system 40 may also include one or more pumps and valves that control the flow of refrigerant through the system.

Figure 6:
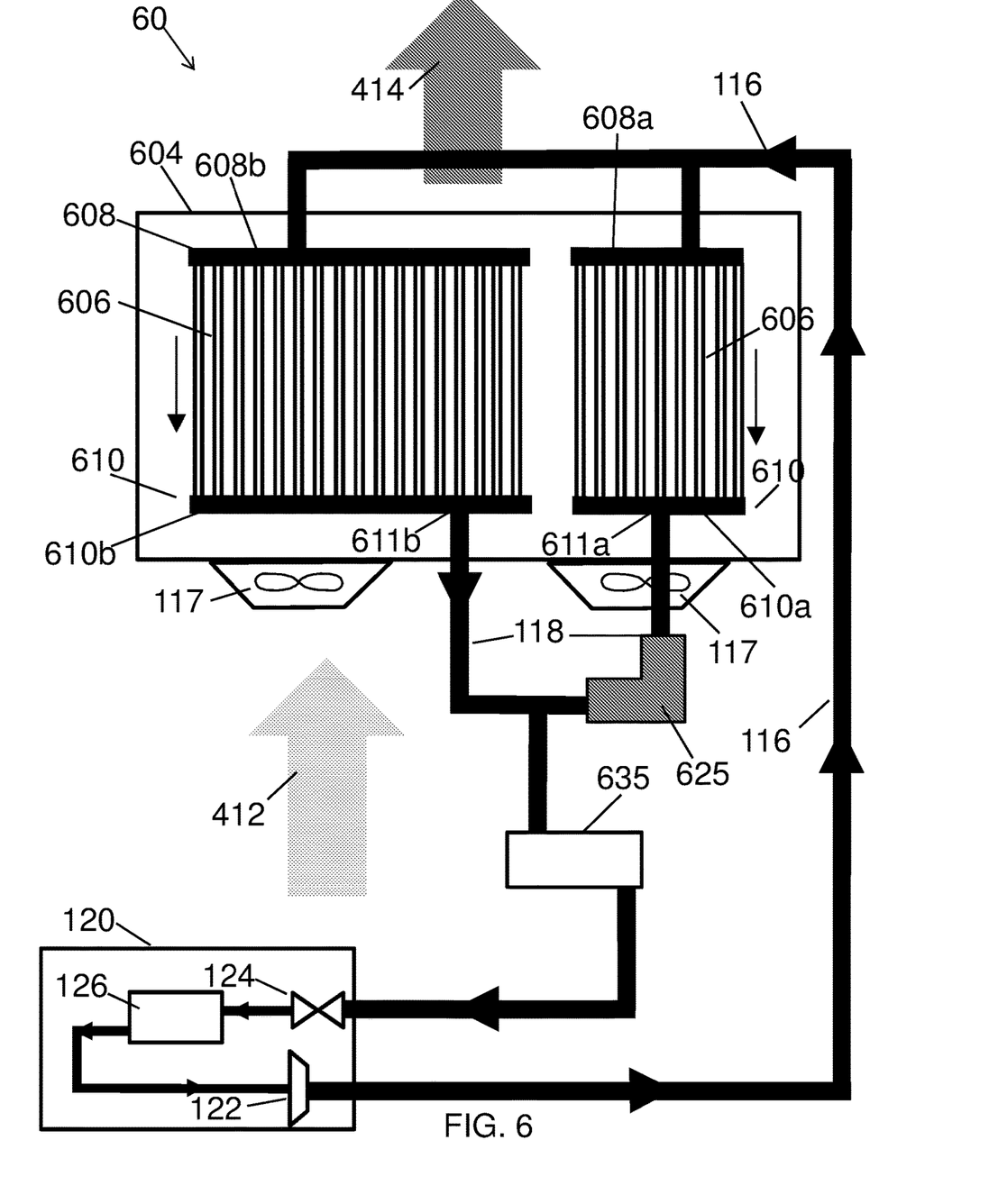
FIG. 6 is a block diagram of another example of a cooling system in accordance with one or more aspects of the invention.

FIG. 6 is a block diagram of a cooling system, generally indicated at 60, according to another exemplary embodiment of the present invention. The cooling system 60 includes a CRAC DX device 120 as previously described and also includes a receiver 635 positioned in between an air-cooled condenser 604 and the CRAC 120.

The air-cooled condenser 604 includes a gas header 608 and a liquid header 610. The liquid header 610 is split into two sections in a similar manner as liquid header 410 of condenser 404 described above; however, the gas header 608 of condenser 604 is also split into two sections 608a and 608b. Parallel tubes 606 extend between gas header section 608a and liquid header section 610a, and between gas header section 608b and liquid header section 610b.

According to the example shown in FIG. 6, gas header section 608a and liquid header section 610a are configured to be smaller (i.e., have smaller internal volume(s)) than gas header section 608b and liquid header section 610b. In some instances, gas header section 608a has a larger size (i.e., larger internal volume) than liquid header section 610a, and gas header section 608b has a larger size than liquid header section 610b. According to one embodiment, the condenser 604 may be split into two sections such that the volume of the smaller section, e.g., gas header 608a, liquid header 610a and the tubes 606 extending therebetween, is about 25% to about 50% of the total volume of the condenser 604. According to other embodiments, the condenser may be partitioned into more than two sections, e.g., three or four or five sections.

According to the example shown in FIG. 6, port 611b of liquid header section 610b (i.e., the larger section) is configured to be in fluid communication with the liquid receiver 635 under all operating conditions, such that port 611b is configured as an outlet for liquid phase refrigerant 118. In cooling system 60, port 611a of liquid header section 610a is configured to be in selective fluid communication with the receiver 635 via a head pressure control valve 625, which is also included in cooling system 60. The head pressure control valve 625 is configured to be positioned downstream and in between ports 611a and 611b of the two liquid header sections 610a and 610b and is configured to respond to changes in condensing pressure in a similar manner as described above, except that valve 625 opens and closes in response to liquid phase refrigerant 118 entering from port 611b of liquid header section 610b instead of the smaller liquid header section 610a. Thus, the example shown in FIG. 6 will have header section 610a (and corresponding tubing 606) be at least partially blocked when the pressure of the liquid phase refrigerant 118 exiting the liquid header section 610b drops below a predetermined value.

In some embodiments, the receiver 635 used in cooling system 60 is a smaller size (i.e., smaller internal volume) than cooling systems that do not include a split condenser as described herein. For example, in one embodiment, the receiver 635 may be configured to have a size that is about 50% to about 100% of the size of the interval volume of the smaller portion of the condenser, e.g., gas header 608a, liquid header 610a and the tubes 606 extending therebetween. This reduces costs associated with the cooling system, since less cooling fluid is required and smaller receivers are less expensive to purchase. In comparison, a receiver that is based on the entire volume of the condenser may typically be sized to be at least 100% of the condenser volume.

In some embodiments, valves may be positioned at the inlets to each of the gas header sections 608a and 608b to control flow of gas phase refrigerant 116 into one or more portions of the gas header 608.

According to certain embodiments, and in a similar manner as described above in reference to valve 425, valve 625 may be configured to allow liquid phase refrigerant 118 from port 611a to exit liquid header section 610a and flow through valve 625 and be in fluid communication with liquid phase refrigerant 118 exiting from port 611b (and liquid header section 610b). In this type of configuration, port 611a functions as an outlet to liquid header section 610a and the liquid phase refrigerant 118 exiting port 611a is in fluid communication with the receiver 635 and CRAC 120 (i.e., the thermal expansion valve 124). Port 611a may thus function as an outlet for liquid phase refrigerant under conditions when additional capacity of the condenser 604 is needed beyond the condensing capacity provided by liquid header section 610b (and the tubes 606 and gas header section 608b associated with liquid header section 610b).

Figure 7A:
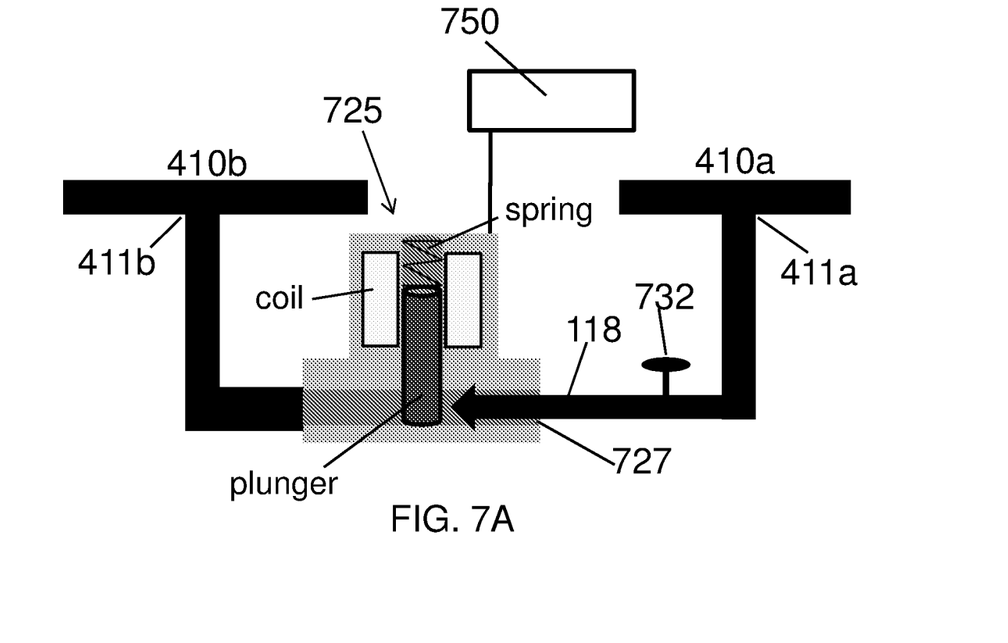
FIG. 7A is a block diagram of another example of a head pressure control valve in a closed configuration in accordance with one or more aspects of the invention.
Figure 7B:
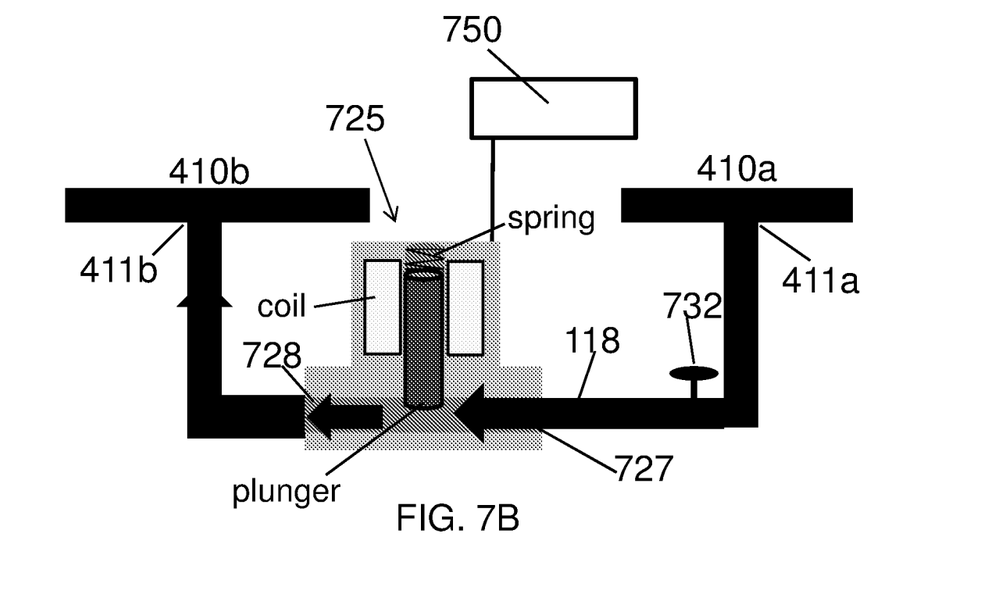
FIG. 7B is a block diagram of the head pressure control valve of FIG. 7A in an open configuration in accordance with one or more aspects of the invention.

In accordance with some embodiments, the head pressure control valve 425 and 625 described above is configured as a solenoid valve. Operation of one example of a head pressure control valve 725 configured as a solenoid valve is shown in FIGS. 7A and 7B, and for the sake of convenience, the valve 725 is shown in combination with features from cooling system 40 of FIG. 4. Head pressure control valve 725 is positioned downstream and in between port 411a and 411b of liquid header 410. In the example shown in FIG. 7, the valve 725 is positioned along a section of conduit that extends between a conduit fluidly coupled to port 411a and a conduit fluidly coupled to port 411b. A ferromagnetic plunger in the valve 725 functions to open and close the valve based on electric current being applied to the electric coils. A controller 750 functions to apply electric current to the coils based on the pressure of the liquid phase refrigerant 118 coming in an inlet 727 of the valve from port 411a of liquid header 410a. The pressure of the liquid phase refrigerant 118 exiting port 411a from liquid header 410a can be measured by a pressure sensor 732 positioned at or downstream from port 411a. The pressure sensor 732 is in communication with controller 750, which is coupled to the valve 725 and controls the amount of current applied to the coils of the valve 725.

In FIG. 7A, when the ambient temperature drops, a lower pressure of liquid phase refrigerant 118 results, which will have a value that is below a predetermined value or range of values that have been set by a user and entered into the controller 750 or automatically determined by the controller 750. When the pressure of the liquid phase refrigerant 118 exiting port 411a is below the predetermined value, the controller 750 is configured to not apply current to the coils, and the plunger is positioned in a "rested" position that places the valve 725 in an "off" or closed state that closes off fluid communication between port 411a and 411b.

In FIG. 7B, when measurements obtained from the pressure sensor 732 indicate to the controller 750 that the pressure of the liquid phase refrigerant 118 has exceeded or is otherwise above the predetermined pressure value, then the controller 750 is configured to apply current to the coils, and the plunger is positioned to an "open" position that places the valve in an "on" or open state and allows fluid communication between port 411a and 411b such that liquid phase refrigerant 118 flows through valve 725, and exits the valve outlet 728 and enters liquid phase header 410b through port 411b.

In some embodiments, when conditions are such that more capacity of the condenser 704 is needed, valve 725 may be configured to allow liquid phase refrigerant 118 to flow out from liquid header section 410b through 411b and through valve 725 to join with liquid refrigerant 118 exiting liquid header section 410a and port 411a. The controller 750 may therefore control the valve 725 to be "open" under these types of conditions.

According to at least one embodiment, a controller is adapted to control the operation of the cooling system, including any of the cooling systems described herein, based on environmental parameters obtained by the controller. For instance, temperature, humidity, airflow, and/or other sensors may be positioned at one or more locations to measure environmental or operating parameters that may be used by the controller to control components of the cooling system. For instance, temperature and humidity data may be obtained of the control space being cooled, temperature data may be obtained of air entering and exiting components of the cooling system, temperature and/or flow rate data may be obtained of the refrigerant entering and exiting components of the cooling unit. The controller may communicate with components of the cooling system (e.g., sensors, valves, CRAC, condenser) and may be configured as a microprocessor or other computing device.

Although the above discussion and embodiments are directed toward a CRAC as the indoor heat exchange or transport device, it is to be appreciated that other types of devices are also within the scope of this disclosure, such as computer room air handlers (CRAH) or pumped refrigerant heat exchangers that are used in combination with a chiller that uses an air-cooled condenser. Any cooling system equipped with an air-cooled type of condenser may benefit from the techniques disclosed herein.

Example

The function and advantage of these and other embodiments of the systems and techniques disclosed herein may be more fully understood from the example below. The following example is intended to illustrate the benefits of the disclosed approach to controlling condensing pressure, but does not limit the scope thereof.

Figure 8:
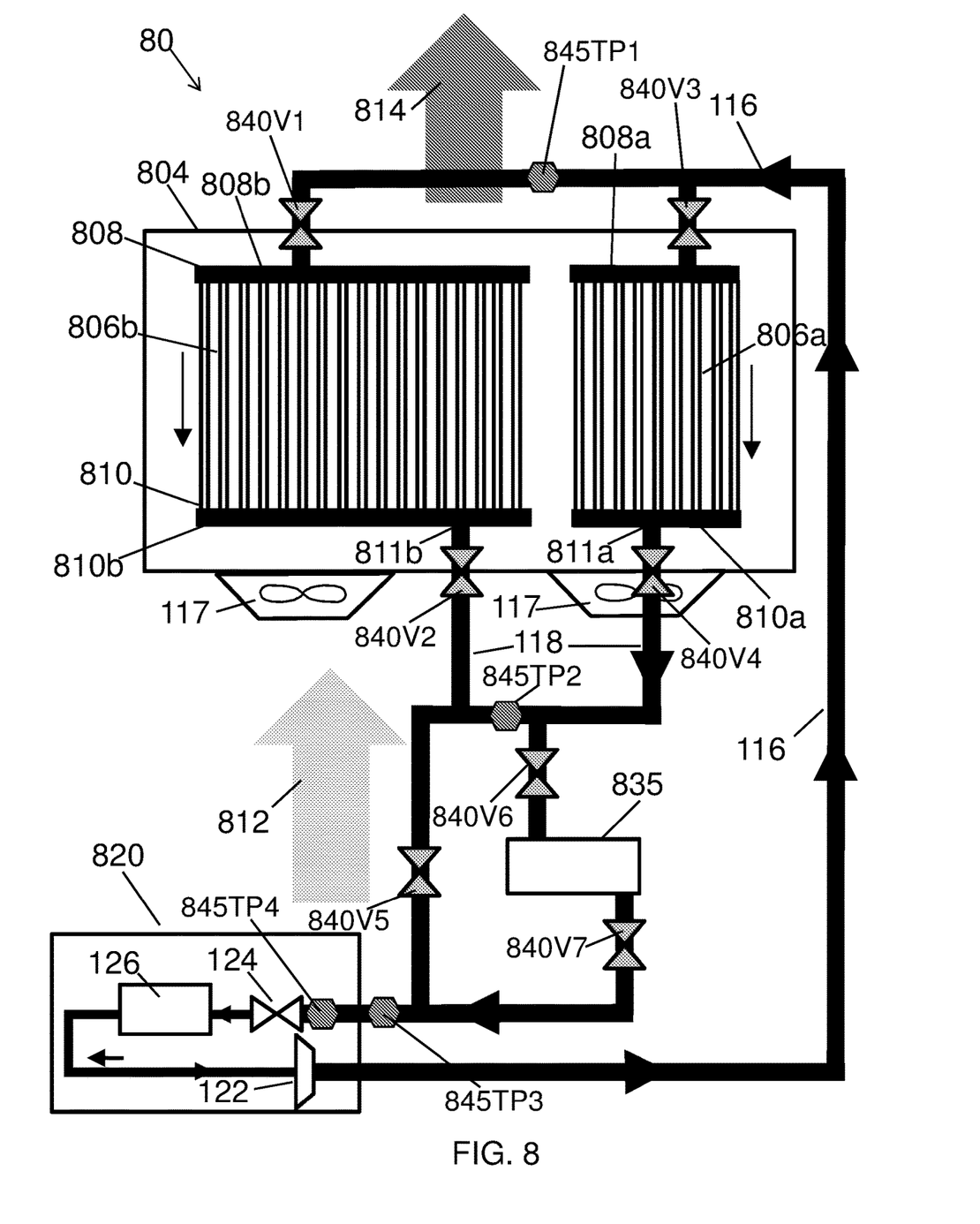
FIG. 8 is a block diagram of an experimental cooling system set up in accordance with one or more aspects of the invention.

Referring to FIG. 8, a cooling system, shown generally at 80, was set up in accordance with the intent to test the split header and pressure control approach described above. Cooling system 80 included an air-cooled condenser 804, CRAC 820, and a liquid receiver 835. The CRAC 820 cooling unit was a 10 T 35 kW capacity unit that used R410A refrigerant (116 and 118). The internal volume of the condenser 804 was 15 liters, and the threshold value set for the condenser pressure was set at 4.0 MPa. To simulate an external environment, the cooling system 80 was placed in dual psychrometric chambers where the temperature of the "outdoor" chamber could be controlled externally.

The air-cooled condenser 804 included a gas header 808 that was split into two sections 808a and 808b, with section 808a sized smaller than section 808b. The air-cooled condenser 804 also included a liquid header 810 that was split into two sections 810a and 810b, with section 810a sized smaller than section 810b, with the ratio being 5:14 between the smaller and bigger portions. Section 808a of the gas header 808 was in fluid communication with section 810a of the liquid header 810 via a first set of parallel tubes 806a. Section 808b of the gas header 808 was in fluid communication with section 810b of the liquid header 810 via a second set of parallel tubes 806b.

The receiver 835 had an interval volume of 10 liters and was configured as a vertical receiver with three sight glasses. The receiver 835 was initially charged with enough liquid phase refrigerant to be visible in the highest sight glass (e.g., enough refrigerant to accommodate temperatures of 35° C. both indoors and outdoors).

Cooling system 80 also included seven ball valves, each indicated at 840, which were used to simulate the function of the pressure control valves 425 and 625 discussed above in reference to cooling system 40 of FIG. 4 and cooling system 60 of FIG. 6, respectively. Valves 840V1 and 840V2 were positioned at the inlet of gas header portion 808b and port 811b, respectively, valves 840V3 and 840V4 were positioned at the inlet of gas header portion 808a and port 811a, respectively, valve 840V5 was positioned downstream of valves 840V2 and 840V3 and upstream from the inlet to CRAC 820, valve 840V6 was positioned downstream of valves 840V2 and 840V3 and upstream from the inlet to the receiver 835, and valve 840V7 was positioned at the outlet of the receiver 835.

Cooling system 80 also included several temperature and pressure sensors 845. One temperature/pressure sensor 845TP1 was positioned at the inlet to the condenser 804, another temperature/pressure sensor 845TP2 was positioned at the outlet of the condenser 804, another temperature/pressure sensor 845TP3 was positioned at the outlet of the receiver 835, and another temperature/pressure sensor 845TP4 was positioned at the inlet of the expansion valve of the CRAC 820.

The default minimum speed of the fan 117 is set to be at 20% of the maximum (which can control condenser pressure when the ambient temperature is −10° C.), but for purposes of avoiding system oscillation during periods when the fan turns off and on, during the testing procedures the minimum speed of the fan 117 was set to be 45% (381 RPM) of the maximum speed of the fan.

The system was tested by attempting to maintain the pressure measured by the pressure/temperature sensor 845TP2 at 2.0 MPa by (1) closing the smaller portion and (2) closing the larger portion of the condenser in separate tests. 2.0 MPa was considered to be the minimum pressure for condenser pressure.

Test 1—Close Smaller Portion of Condenser

With the fan speed set at 45%, the steady-state pressure measured at 845TP2 was 2.0 MPa when the ambient temperature ("outdoor" chamber temperature) was 15° C. Valves 840V3 and 840V4 were then quickly closed to close off the smaller portion of the condenser 804. The pressure at 845TP2 rose to 2.3 MPa, and the liquid level in the receiver 835 did not change.

Valves 840V3 and 840V4 were opened, and the system returned to steady-state. The ambient temperature was decreased to 10° C., and only valve 840V4 was closed. This caused the level of refrigerant in the liquid receiver to drop to the middle sight glass, which signified a volume change of about 2 liters, which indicates that in this example, a receiver sized at 2 liters would be sufficient.

Test 2—Close Larger Portion of Condenser

As indicated above, when the fan speed was set at 45%, the steady-state pressure measured at 845TP2 (the outlet of the condenser 804) was 2.0 MPa when the ambient temperature was 15° C. Valve 840V1 was quickly closed (valve 840V2 was also closed), and the pressure measured at 845TP2 increased to a value that triggered the high head pressure alarm (i.e., 4.0 MPa). It was found that the head pressure value could be maintained below the alarm value if valve 840V1 was open and closed in short increments.

Valve 840V1 was opened, and the system returned to steady-state. The ambient temperature was decreased to 10° C., and valve 840V2 was closed, and valve 840V1 was open and closed in short increments until the system reached a pressure of 2.8 MPa. The fluid in the receiver dropped to a level below the lowest sight glass, which indicated that the 10 liter receiver was not large enough.

CONCLUSIONS

The results from the tests indicated that the condenser can maintain proper head pressure when the condenser is split into separate sections. The results also indicated that closing off the smaller portion was preferable to closing the larger portion of the condenser. A smaller receiver can also be used for a cooling system that includes a split condenser.

A cost analysis between a traditional system that does not include a split condenser and head pressure control valve (e.g., system 30 of FIG. 3) and a system that does include the split condenser and head pressure control valve was performed (e.g., systems 60 of FIG. 6), and the results are indicated below in Table 1.

TABLE 1 cost comparison between traditional system and system with split condenser

| Traditional system | | Cost ($) | Split condenser system | Cost ($) |
|---|---|---|---|---|
| Flooded kit | Three-way modulating valve | 118 | Head pressure control valve | 59 |
| | Check valve | 14 | Receiver (10 liters) | 59 |
| | Receiver (20 liters) | 100 | Safety valve | 44 |
| | Safety valve | 69 | | |
| | Total | 301 | Total | 162 |

The cost analysis indicates that the split condenser system was about 46% less expensive than the traditional system. Additional savings in the split condenser system are also included in lower piping, insulation, and refrigerant costs.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. A cooling system comprising:
   a heat exchanger;
   a thermal expansion valve configured to control the delivery of liquid phase refrigerant to the heat exchanger;

a condenser fluidly coupled to the thermal expansion valve and configured to condense gas phase refrigerant to liquid phase refrigerant, the condenser including:
    a gas header configured to receive gas phase refrigerant, the gas header separated into at least two sections, a first section and a second section, each section having an inlet port;
    a liquid header disposed downstream from the gas header, the liquid header separated into at least two sections, a third section and a fourth section, which correspond to the first section and the second section of the gas header, respectively, each section of the at least two sections having an outlet port in fluid communication with the heat exchanger;
parallel tubes extending between the gas header and the liquid header;
a head pressure control valve positioned downstream and in between the outlet port of the third section and the outlet port of the fourth section of the liquid header; and
a pressure sensor positioned downstream from the outlet port of the third section of the liquid header; and
a controller coupled to the control valve and the pressure sensor, the controller being configured to place the control valve in a closed state to close off fluid communication between the outlet port of the third section of the liquid header and the outlet port of the fourth section of the liquid header when a pressure of the outlet port of the third section of the liquid header as determined by the pressure sensor is below a predetermined value, and configured to place the control valve in an open state to allow fluid communication between the outlet port of the third section of the liquid header and the outlet port of the fourth section of the liquid header when a pressure of the outlet port of the third section of the liquid header as determined by the pressure sensor is above the predetermined value, wherein the open state of the control valve enables liquid phase refrigerant from the outlet port of the third section of the liquid header to enter the outlet port of the fourth section of the liquid header.

2. The cooling system of claim 1, wherein one section of the first section and the second section of the liquid header has an internal volume that is of a different size than an internal volume of the other section of the first section and the second section.

3. The cooling system of claim 1, wherein the outlet port of the first section of the liquid header is configured to be fluidly coupled to the thermal expansion valve, and the control valve is configured such that the outlet port of the second section of the liquid header is in selective fluid communication with the thermal expansion valve.

4. The cooling system of claim 3, wherein the control valve is configured to direct liquid phase refrigerant to the outlet port of the second section of the liquid header when the pressure of liquid phase refrigerant exiting the outlet port of the first section exceeds a predetermined value.

5. The cooling system of claim 3, wherein the first section of the liquid header is configured to have a smaller internal volume than an internal volume of the second section of the liquid header.

6. The cooling system of claim 3, wherein the first section of the liquid header is configured to have a larger internal volume than an internal volume of the second section of the liquid header.

7. The cooling system of claim 3, wherein the first section of the gas header is fluidly coupled to the first section of the liquid header by a first series of parallel tubes, and the second section of the gas header is fluidly coupled to the second section of the liquid header by a second series of parallel tubes.

8. The cooling system of claim 7, wherein the first section of the gas header, the first section of the liquid header, and the first series of parallel tubes has an internal volume of from about 25% to about 50% of a total internal volume of the condenser.

9. The cooling system of claim 3, further comprising a receiver configured to store liquid phase refrigerant and positioned in between the condenser and the thermal expansion valve such that the outlet port of the first section of the liquid header is fluidly coupled to the receiver and the outlet port of the second section of the liquid header is in selective fluid communication with the receiver.

10. The cooling system of claim 1, wherein the condenser is configured as an air-cooled condenser and the system further comprises at least one air mover configured to direct air over the condenser.

11. The cooling system of claim 10, wherein the air mover includes at least one variable speed fan.

12. The cooling system of claim 1, wherein the controller further is configured to allow liquid phase refrigerant to flow out of the outlet port of the fourth section of the liquid header through the control valve to join liquid phase refrigerant exiting the outlet port of the third section of the liquid header.

* * * * *